(12) United States Patent
Welinder et al.

(10) Patent No.: US 9,704,106 B2
(45) Date of Patent: *Jul. 11, 2017

(54) SYSTEMS AND METHODS FOR LABELING SOURCE DATA USING CONFIDENCE LABELS

(71) Applicant: California Institute of Technology, Pasadena, CA (US)

(72) Inventors: Peter Welinder, San Diego, CA (US); Pietro Perona, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,609

(22) Filed: May 27, 2016

(65) Prior Publication Data

US 2016/0275417 A1 Sep. 22, 2016

Related U.S. Application Data

(63) Continuation of application No. 13/915,962, filed on Jun. 12, 2013, now Pat. No. 9,355,359.

(60) Provisional application No. 61/663,138, filed on Jun. 22, 2012.

(51) Int. Cl.
*G06N 5/04* (2006.01)
*G06F 17/30* (2006.01)
*G06N 99/00* (2010.01)
*G06F 17/24* (2006.01)

(52) U.S. Cl.
CPC ......... *G06N 99/005* (2013.01); *G06F 17/241* (2013.01); *G06F 17/30303* (2013.01); *G06F 17/30525* (2013.01); *G06F 17/30598* (2013.01); *G06N 5/048* (2013.01)

(58) Field of Classification Search
None
See application file for complete search history.

(56) References Cited

U.S. PATENT DOCUMENTS 6,636,843 B2 10/2003 Doddi
6,897,875 B2 5/2005 Zhang
(Continued)

OTHER PUBLICATIONS

Bitton, E. (2011). "Geometric Models for Collaborative Search and Filtering." 186 pages.*
(Continued)

*Primary Examiner* — Paulinho E Smith
*Assistant Examiner* — Benjamin Buss
(74) *Attorney, Agent, or Firm* — KPPB LLP

(57) ABSTRACT

Systems and methods for the annotation of source data using confidence labels in accordance embodiments of the invention are disclosed. In one embodiment of the invention, a method for determining confidence labels for crowdsourced annotations includes obtaining a set of source data, obtaining a set of training data representative of the set of source data, determining the ground truth for each piece of training data, obtaining a set of training data annotations including a confidence label, measuring annotator accuracy data for at least one piece of training data, and automatically generating a set of confidence labels for the set of unlabeled data based on the measured annotator accuracy data and the set of annotator labels used.

20 Claims, 5 Drawing Sheets

(56) References Cited

U.S. PATENT DOCUMENTS

| | | | |
|---|---|---|---|
| 7,610,130 B1* | 10/2009 | Dixon | B60W 40/08 |
| | | | 701/36 |
| 7,809,722 B2 | 10/2010 | Gokturk et al. | |
| 7,987,186 B1 | 7/2011 | Joshi | |
| 8,041,568 B2 | 10/2011 | Strope | |
| 8,418,249 B1 | 4/2013 | Nucci et al. | |
| 8,818,793 B1 | 8/2014 | Bangalore et al. | |
| 8,849,648 B1 | 9/2014 | Bangalore et al. | |
| 9,239,848 B2 | 1/2016 | Liu et al. | |
| 9,344,466 B1 | 5/2016 | Abuzalaf | |
| 9,355,167 B2 | 5/2016 | Gomes et al. | |
| 9,355,359 B2 | 5/2016 | Welinder et al. | |
| 9,355,360 B2 | 5/2016 | Welinder et al. | |
| 9,483,794 B2 | 11/2016 | Amtrup et al. | |
| 2006/0129596 A1 | 6/2006 | Bays | |
| 2008/0005064 A1 | 1/2008 | Sarukkai et al. | |
| 2008/0016102 A1 | 1/2008 | Albornoz | |
| 2010/0023553 A1 | 1/2010 | Gausman | |
| 2011/0274334 A1 | 11/2011 | Zhu | |
| 2012/0158620 A1* | 6/2012 | Paquet | G06N 99/005 |
| | | | 706/12 |
| 2012/0221508 A1* | 8/2012 | Chaturvedi | G06F 17/00 |
| | | | 707/602 |
| 2013/0024457 A1 | 1/2013 | Chua et al. | |
| 2013/0031457 A1 | 1/2013 | Griffiths et al. | |
| 2013/0080422 A1 | 3/2013 | Pan | |
| 2013/0097164 A1 | 4/2013 | Welinder et al. | |
| 2014/0188879 A1 | 7/2014 | Welinder et al. | |
| 2014/0289246 A1 | 9/2014 | Gomes et al. | |
| 2014/0304270 A1 | 10/2014 | Torkamani et al. | |
| 2016/0275173 A1 | 9/2016 | Gomes et al. | |
| 2016/0275418 A1 | 9/2016 | Welinder et al. | |

OTHER PUBLICATIONS

Little et al., "Exploring Iterative and Parallel Human Computational Processes", HCOMP, 2010, pp. 68-76.

Little et al., "TurKit: Tools for Iterative Tasks on Mechanical Turk", HCOMP, 2009, pp. 29-30.

Maceachern et al., "Estimating Mixture of Dirichlet Process Models", Journal of Computational and Graphical Statistics, Jun. 1998, vol. 7, No. 2, pp. 223-238.

Mackay, "Information-Based Objective Functions for Active Data Selection", Neural Computation, 1992, vol. 4, pp. 590-604.

Martinez-Munoz et al., "Dictionary-Free Categorization of Very Similar Objects via Stacked Evidence Trees", Source unknown, 2009, 8 pgs.

Meila, "Comparing Clusterings by the Variation of Information", Learning theory and Kernel machines: 16th Annual Conference of Learning Theory and 7th Kernel Workshop, COLT/Kernel 2003, 31 pgs.

Monti et al., "Consensus Clustering: A Resampling-Based Method for Class Discovery and Visualization of Gene Expression Microarray Data", Machine Learning, 2003, vol. 52, pp. 91-118.

Neal, "MCMC Using Hamiltonian Dynamics", Handbook of Markov Chain Monte Carlo, 2010, pp. 113-162.

Nigam et al., "Text Classification from labeled and Unlabeled Documents Using EM", Machine Learning, 2000, vol. 39, No. 2/3, pp. 103-134.

Platt, "Probalisitic Outputs for Support Vector Machines and Comparisons to Regularized Likelihood Methods", Advances in Large Margin Classiers, 1999, MIT Press, pp. 61-74.

Raykar et al., "Supervised Learning from Multiple Experts: Whom to trust when everyone lies a bit", ICML, 2009, 8 pgs.

Russell et al., "LabelMe: A Database and Web-Based Tool for Image Annotation", Int. J. Comut. Vis., 2008, vol. 77, pp. 157-173.

Seeger, "Learning with labeled and unlabeled data", Technical Report, University of Edinburgh, 2002, 62 pgs.

Sheng et al., "Get Another Label? Improving Data Quality and Data Mining Using Multiple, Noisy Labelers", KDD, 2008, 9 pgs.

Smyth et al., "Inferring Ground Truth from Subjective Labelling of Venus Images", NIPS, 1995, 8 pgs.

Snow et al., "Cheap and Fast—But is it Good? Evaluating Non-Expert Annotations for Natural Language Tasks", EMNLP, 2008, 10 pgs.

Sorokin et al., "Utility data annotation with Amazon Mechanical Turk", First IEEE Workshop on Internet Vision at CVPR '08, 2008, 8 pgs.

Spain et al., "Some objects are more equal than others: measuring and predicting importance", ECCV, 2008, 14 pgs.

Strehl et al., "Cluster Ensembles—A Knowledge Reuse Framework for Combining Multiple Partitions", Journal of Machine Learning Research, 2002, vol. 3, pp. 583-617.

Tong et al, "Support Vector Machine Active Learning with Applications to Text Classification", Journal of Machine Learning Research, 2001, pp. 45-66.

Vijayanarasimhan et al, "Large-Scale Live Active Learning: Training Object Detectors with Crawled Data and Crowds", CVPR, 2001, pp. 1449-1456.

Vijayanarasimhan et al., "What's It Going to Cost You?: Predicting Effort vs. Informataiveness for Multi-Label Image Annotations", CVPR, 2009, pp. 2262-2269.

Von Ahn et al., "Labeling Images with a Computer Game", SIGCHI conference on Human factors in computing systems, 2004, pp. 319-326.

Von Ahn et al., "reCAPTCHA: Human-Based Character Recognition via Web Security Measures", Science, 2008, vol. 321, No. 5895, pp. 1465-1468.

Vondrick et al, "Efficiently Scaling up Video Annotation with Crowdsourced Marketplaces", ECCV, 2010, pp. 610-623.

Welinder et al., "Caltech-UCSD Birds 200", Technical Report CNS-TR-2010-001, 2001, 15 pgs.

Welinder et al., "Online crowdsourcing: rating annotators and obtaining cost-effective labels", IEEE Conference on Computer Vision and Pattern Recognition Workshops (ACVHL), 2010, pp. 25-32.

Welinder et al., "The Multidimensional Wisdom of Crowds", Neural Information Processing Systems Conference (HIPS), 2010, pp. 1-9.

Whitehill et al, "Whose Vote Should Count More: Optimal Integration of Labels from Labelers of Unknown Expertise", NIPS, 2009, 9 pgs.

Zhu, "Semi-Supervised Learning Literature Survey", Technical report, University of Wisconsin—Madison, 2008, 60 pgs.

Antoniak, "Mixtures of Dirchlet Processes with Applications to Bayesian Nonparametric Problems", The Annals of Statistics, 1974, vol. 2, No. 6, pp. 1152-1174.

Attias, "A Variational Bayesian Framework for Graphical Models", NIPS, 1999, pp. 209-215.

Bennett, "Using Asymmetric Distributions to Improve Classifier Probabilities: A Comparison of New and Standard Parametric Methods", Technical report, Carnegie Mellon University, 2002, 24 pgs.

Berg et al., "Automatic Attribute Discovery and Characterization from Noisy Web Data", Computer Vision—ECCV 2010, pp. 663-676.

Beygelzimer et al., "Importance Weighted Active Learning", Proceedings of the 26th International Conference on Machine Learning, 2009, 8 pgs.

Bourdev et al., "Poselets: Boyd Part Detectors Trained Using 3D Human Pose Annotations", ICCV, 2009, 42 pgs.

Byrd et al., "A Limited Memory Algorithm for Bound Constrained Optimization", SIAM Journal on Scientific and Statistical Computing, 1995, vol. 16, No. 5, pp. 1190-1208.

Cohn et al., "Active Learning with Statistical Models", Journal of Artificial Intelligence Research, 1996, vol. 4, pp. 129-145.

Dalal et al., "Histograms of Oriented Gradients for Human Detection", ICCV, 2005, 8 pgs.

Dankert et al., "Automated Monitoring and Analysis of Social Behavior in *Ddrosophila*", Nat. Methods, Apr. 2009, vol. 6, No. 4, 17 pgs.

(56) References Cited

OTHER PUBLICATIONS

Dasgupta et al., "Hierarchical Sampling for Active Learning", ICML, 2008, 8 pgs.
Dawid et al., "Maximum Likelihood Estimation of Observer Error-rates using the EM Algorithm", J. Roy. Statistical Society, Series C, 1979, vol. 28, No. 1, pp. 20-28.
Deng et al., "ImageNet: A Large-Scale Hierarchical Image Database", IEEE Computer Vision and Pattern Recognition, 2009, 8 pgs.
Dollar et al., "Cascaded Pose Regression", CVPR, 2010, pp. 1078-1085.
Dollar et al., "Pedestrian Detection: An Evaluation of the State of the Art", IEEE Transactions on Pattern Analysis and Machine Intelligence, 2011, 20 pgs.
Erkanli et al., "Bayesian semi-parametric ROC analysis", Statistics in Medicine, 2006, vol. 25, pp. 3905-3928.
Fei-Fei et al., "A Bayesian Hierarchical Model for Learning Natural Scene Categories", CVPR, IEEE Computer Society, 2005, pp. 524-531.
Frank et al., "UCI Machine Learning Repository", 2010, 3 pgs.
Fuchs et al., "Randomized tree ensembles for object detection in computational pathology", Lecture Notes in Computer Science, ISVC, 2009, vol. 5875, pp. 367-378.
Gionis et al., "Clustering Aggregation", ACM Transactions on Knowledge Discovery from Data, 2007, vol. 1, 30 pgs.
Gomes et al., "Crowdclustering", Technical Report, Caltech 20110628-202526159, Jun. 2011, 14 pgs.
Gomes et al., "Crowdclustering", Technical Report, Caltech, 2011, pp. 558-561.
Gu et al, "Bayesian bootstrap estimation of ROC curve", Statistics in Medicine, 2008, vol. 27, pp. 5407-5420.
Jaakkola et al., "A variational approach to Bayesian logistic regression models and their extensions", Source unknown, Aug. 13, 1996, 10 pgs.
Kruskal, "Multidimensional Scaling by Optimizing Goodness of Fit to a Nonmetric Hypothesis", Psychometrika, Mar. 1964. vol. 29, No. 1, pp. 1-27.
Kurihara et al., "Accelerated Variational Dirichlet Process Mixtures", Advances in Neural Information Processing Systems, 2007, 8 pgs.
Li et al., "Solving consensus and Semi-supervised Clustering Problems Using Nonnegative Matrix Factorization", ICDM, IEEE computer society 2007. pp. 577-582.
Ertekin et al., "Learning to predict the wisdom of crowds", arXiv preprint arXiv:1204.3611 v1, Apr. 16, 2012, 8 Pages.
Ertekin et al., "Wisely Using a Budget for Crowdsourcing", Or 392-12. Massachusetts Institute of Technology, Apr. 1, 2012, 31 pages.
Hellmich et al., "Bayesian Approaches to Meta-analysis of ROC Curves", Med. Decis. Making, Jul. 1, 1999, vol. 19, pp. 252-264.
Zhao et al., "Robust Active Learning Using Crowdsourced Annotations for Activity Recognition", In Human Computation: Papers from the 2011 AIII Workshop, Jan. 1, 2011, pp. 74-79.

\* cited by examiner

SYSTEMS AND METHODS FOR LABELING SOURCE DATA USING CONFIDENCE LABELS

CROSS-REFERENCE TO RELATED APPLICATIONS

The current application is a continuation of U.S. patent application Ser. No. 13/915,962, filed Jun. 12, 2013 and issued as U.S. Pat. No. 9,355,359 on May 31, 2016, which claims priority to U.S. Provisional Patent Application No. 61/663,138, titled "Method for Combining Human and Machine Computation for Classification and Regression Tasks" to Welinder et al. and filed Jun. 22, 2012, the disclosures of which are hereby incorporated by reference in their entirety.

STATEMENT OF FEDERAL FUNDING

This invention was made with government support under Grant No. IIS0413312 awarded by the National Science Foundation and under Grant No. N00014-06-1-0734 and Grant No. N00014-10-1-0933 awarded by the Office of Naval Research. The government has certain rights in the invention.

FIELD OF THE INVENTION

The present invention is generally related to data annotation and more specifically the annotation of data using confidence labels.

BACKGROUND OF THE INVENTION

Amazon Mechanical Turk is a service provided by Amazon.com of Seattle, Wash. Amazon Mechanical Turk provides the ability to submit tasks and have a human complete the task in exchange for a monetary reward for completing the task.

The Likert scale is a psychometric scale that allows respondents to specify their level of agreement with a particular statement (known as a Likert item) on a symmetric agreement-disagreement scale. A Likert item is simply a statement that the respondent is asked to evaluate according to any kind of subjective or objective criteria.

SUMMARY OF THE INVENTION

Systems and methods for the annotation of source data using confidence labels in accordance embodiments of the invention are disclosed. In one embodiment of the invention, a method for determining confidence labels for crowdsourced annotations includes obtaining a set of source data using a distributed data annotation server system, obtaining a set of training data using the distributed data annotation server system, where the set of training data includes a subset of the source data representative of the set of source data, determining the ground truth for each piece of training data in the set of training data using the distributed data annotation server system, where the ground truth for a piece of data describes the content of the piece of data, obtaining a set of training data annotations from a plurality of data annotation devices using the distributed data annotation server system, where a training data annotation includes a confidence label selected from a set of confidence labels describing an estimation of the content of a piece of training data in the set of training data, measuring annotator accuracy data for at least one piece of training data in the set of training data based on the ground truth for each piece of training source data and the set of training data annotations using the distributed data annotation server system, where annotator accuracy data describes the difficulty of determining the ground truth for a piece of training data, and automatically generating a set of confidence labels for the set of unlabeled data based on the measured annotator accuracy data and the set of annotator labels used using the distributed data annotation server system.

In another embodiment of the invention, determining confidence labels for crowdsourced annotations further includes creating an annotation task including the set of confidence labels using the distributed data annotation server system, where the annotation tasks configures a data annotation device to annotate one or more pieces of source data using the set of confidence labels.

In an additional embodiment of the invention, at least one of the plurality of data annotation devices is implemented using the distributed data annotation server system.

In yet another additional embodiment of the invention, at least one of the plurality of data annotation devices is implemented using human intelligence tasks.

In still another additional embodiment of the invention, determining confidence labels for crowdsourced annotations further includes determining the number of confidence labels to generate based on the set of training data using the distributed data annotation server system.

In yet still another additional embodiment of the invention, the number of confidence labels to be generated is determined by calculating the number of confidence labels that maximizes the amount of information obtained from the confidence labels using the distributed data annotation server system.

In yet another embodiment of the invention, determining confidence labels for crowdsourced annotations further includes determining a set of labeling tasks using the distributed data annotation server system, where a labeling tasks instructs an annotator to provide a label describing at least one feature of a piece of source data.

In still another embodiment of the invention, determining confidence labels for crowdsourced annotations further includes determining rewards based on the generated confidence labels using the distributed data annotation server system, where the rewards are based on the annotator accuracy data.

In yet still another embodiment of the invention, the rewards are determined by calculating a reward matrix using the distributed data annotation server system, where the reward matrix specifies a reward to be awarded to a particular confidence label based on the ground truth of the piece of source data that is targeted by the confidence label.

In yet another additional embodiment of the invention, the reward for annotating a piece of source data is based on the difficulty of the piece of source data, where the difficulty of a piece of source data is determined based on a set of annotations provided for the source data and a ground truth value associated with the piece of source data.

In still another additional embodiment of the invention, determining confidence labels for crowdsourced annotations further includes generating labeling threshold data based on the training data annotations and the measured annotator accuracy using the distributed data annotation server system, where the labeling threshold data provides guidance to a data annotation device regarding the meaning of one or more confidence labels in the set of confidence labels, providing the labeling threshold data along with the set of training data to a data annotation device using the distributed data annotation server system, and generating feedback based on annotations provided by the data annotation device based on the labeling threshold data and the set of training data using the distributed data annotation server system, where the feedback configures the data annotation device to utilize the labeling threshold data in the annotation of source data.

In yet still another additional embodiment of the invention, each confidence label in the set of confidence labels includes a confidence interval identified based on the measured annotator accuracy data and the distribution of the set of annotator labels within the pieces of training data in the set of training data.

Still another embodiment of the invention includes a distributed data annotation server system including a processor and a memory connected to the process and configured to store a data annotation application, wherein the data annotation application configures the processor to obtain a set of source data, obtain a set of training data, where the set of training data includes a subset of the source data representative of the set of source data, determine the ground truth for each piece of training data in the set of training data, where the ground truth for a piece of data describes the content of the piece of data, obtain a set of training data annotations from a plurality of data annotation devices, where a training data annotation includes a confidence label selected from a set of confidence labels describing an estimation of the content of a piece of training data in the set of training data, measure annotator accuracy data for at least one piece of training data in the set of training data based on the ground truth for each piece of training source data and the set of training data annotations, where annotator accuracy data describes the difficulty of determining the ground truth for a piece of training data, and automatically generate a set of confidence labels for the set of unlabeled data based on the measured annotator accuracy data and the set of annotator labels used.

In yet another additional embodiment of the invention, the data annotation application further configures the processor to create an annotation task including the set of confidence labels, where the annotation tasks configures a data annotation device to annotate one or more pieces of source data using the set of confidence labels.

In still another additional embodiment of the invention, at least one data annotation device in the plurality of data annotation devices is implemented using the distributed data annotation server system.

In yet still another additional embodiment of the invention, at least one data annotation device in the plurality of data annotation devices is implemented using human intelligence tasks.

In yet another embodiment of the invention, the data annotation application further configures the processor to determine the number of confidence labels to generate based on the set of training data.

In still another embodiment of the invention, the number of confidence labels to be generated is determined by calculating the number of confidence labels that maximizes the amount of information obtained from the confidence labels.

In yet still another embodiment of the invention, the data annotation application further configures the processor to determine a set of labeling tasks, where a labeling tasks instructs an annotator to provide a label describing at least one feature of a piece of source data.

In yet another additional embodiment of the invention, the data annotation application further configures the processor to determine rewards based on the generated confidence labels, where the rewards are based on the annotator accuracy data.

In still another additional embodiment of the invention, the rewards are determined by calculating a reward matrix, where the reward matrix specifies a reward to be awarded to a particular confidence label based on the ground truth of the piece of source data that is targeted by the confidence label.

In yet still another additional embodiment of the invention, the reward for annotating a piece of source data is based on the difficulty of the piece of source data, where the difficulty of a piece of source data is determined based on a set of annotations provided for the source data and a ground truth value associated with the piece of source data.

In yet another embodiment of the invention, the data annotation application further configures the processor to generate labeling threshold data based on the training data annotations and the measured annotator accuracy, where the labeling threshold data provides guidance to a data annotation device regarding the meaning of one or more confidence labels in the set of confidence labels, provide the labeling threshold data along with the set of training data to a data annotation device, and generate feedback based on annotations provided by the data annotation device based on the labeling threshold data and the set of training data, where the feedback configures the data annotation device to utilize the labeling threshold data in the annotation of source data.

In still another embodiment of the invention, each confidence label in the set of confidence labels includes a confidence interval identified based on the measured annotator accuracy data and the distribution of the set of annotator labels within the pieces of training data in the set of training data.

Yet another embodiment of the invention includes method of annotating source data using confidence labels including obtaining a set of source data using a distributed data annotation server system, where the set of source data includes at least one piece of unlabeled source data, determining a set of annotation tasks using the distributed data annotation server system, where an annotation task in the set of annotation tasks includes a set of confidence labels determined by obtaining a set of training data, where the set of training data includes a subset of the source data representative of the set of source data, determining the ground truth for each piece of training data in the set of training data, where the ground truth for a piece of data describes the content of the piece of data, obtaining a set of training data annotations, where a training data annotation includes a confidence label selected from a set of confidence labels describing an estimation of the content of a piece of training data in the set of training data, measuring annotator accuracy data for at least one piece of training data in the set of training data based on the ground truth for each piece of training source data and the set of training data annotations, where annotator accuracy data describes the difficulty of determining the ground truth for a piece of training data, and automatically generating a set of confidence labels for the set of unlabeled data based on the measured annotator accuracy data and the set of annotator labels used, distributing the set of annotation tasks and the set of source data to one or more data annotation devices using the distributed data annotation server system, receiving a set of annotations and a set of annotator confidence labels from the data annotation devices using the distributed data annotation server system, where an annotator confidence label in the set of annotator confidence labels identifies a particular annotation in the set of annotations and describes the confidence the data annotation device has in the particular annotation, and determining the ground truth associated with one or more pieces of source data in the set of source data based on the set of annotations and the set of confidence labels associated with the particular pieces of source data using the distributed data annotation server system.

DETAILED DESCRIPTION

Figure 1:
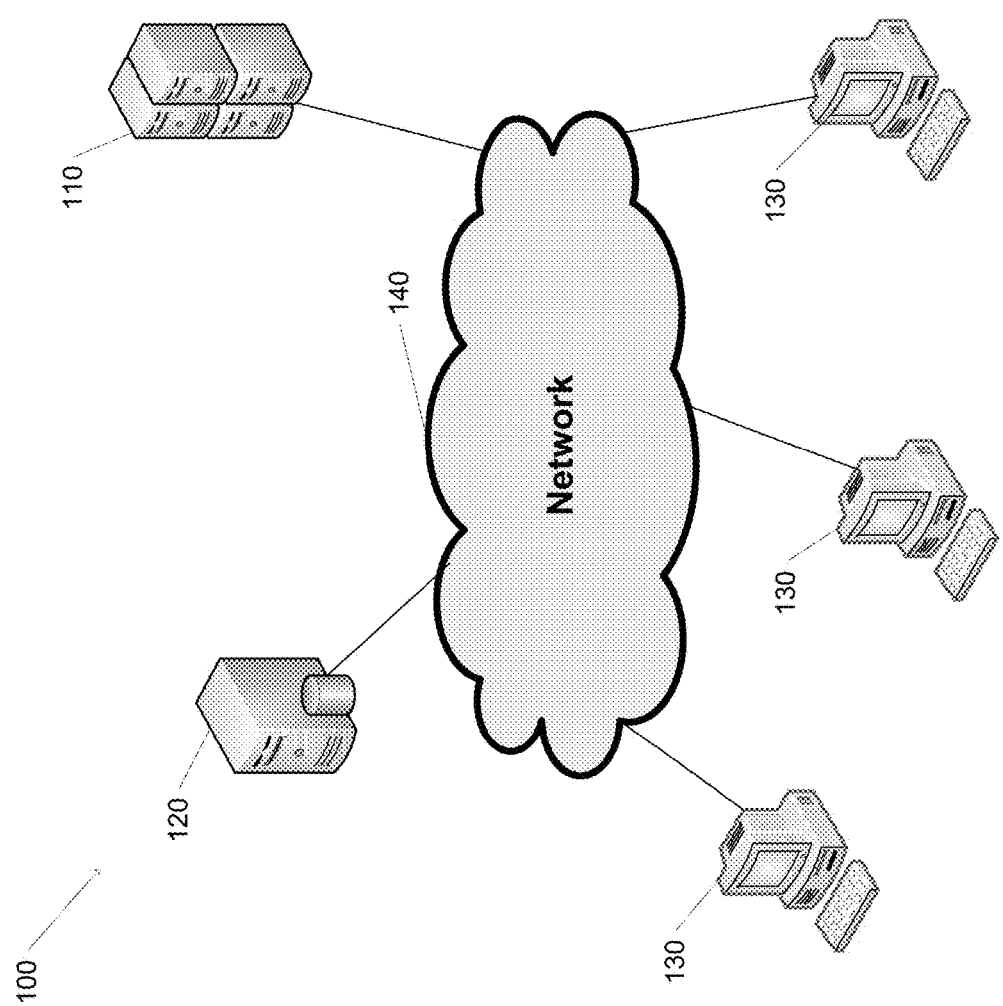
FIG. 1 conceptually illustrates a distributed data annotation system in accordance with an embodiment of the invention.

Turning now to the drawings, systems and methods for distributed annotation of source data using confidence labels in accordance with embodiments of the invention are illustrated. In a variety of applications including, but not limited to, medical diagnosis, surveillance verification, performing data de-duplication, transcribing audio recordings, or researching data details, a large variety of source data, such as image data, audio data, signal data, and text data can be generated and/or obtained. By annotating pieces of source data, properties of the source data can be determined for particular purposes (such as classification, categorization, and/or identification of the source data) and/or additional analysis. Systems and methods for annotating source data that can be utilized in accordance with embodiments of the invention are disclosed in U.S. patent application Ser. No. 13/651,108, titled "Systems and Methods for Distributed Data Annotation" to Welinder et al. and filed Oct. 12, 2012, the entirety of which is hereby incorporated by reference. However, there can be uncertainty in the provided annotations. For example, an annotator may be unsure of the provided annotations, the source data may be difficult to annotate, and/or ambiguities may exist in the source data and/or the annotation task. This uncertainty can lead to difficulties in the determination of properties of the source data. Distributed data annotation server systems in accordance with embodiments of the invention are configured to utilize confidence labels in the annotation of source data. Confidence labels allow an annotator (such as a data annotation device) to indicate the (un)certainty associated with a particular annotation applied to a piece of source data. Based on the confidence label, the particular annotation can be emphasized (or de-emphasized) based on the confidence the annotator has in the accuracy of the annotation.

Distributed data annotation server systems can generate one or more confidence labels for one or more annotation tasks designed to determine information (such as a ground truth) for pieces of source data. Annotation tasks direct data annotation devices to provide one or more annotations for pieces of source data. Annotations for a piece of source data can include a variety of metadata describing the piece of source data, including labels, confidence labels, and other information as appropriate to the requirements of specific applications in accordance with embodiments of the invention. Labels describe the properties of the piece of source data as interpreted by the data annotation device. The labels can be provided by the data annotation devices and/or be described as a labeling task included in the annotation task. Annotations applied to pieces of source data using confidence labels can be inconsistent across annotation tasks in that different annotators can utilize the confidence labels in different manners. In a variety of embodiments, labeling threshold data is provided along with the confidence labels as part of the annotation task. Labeling threshold data describes the meaning of the confidence labels within the annotation task and is utilized by data annotation devices in the determination of labels and/or confidence labels applied as annotations to pieces of source data. By utilizing labeling threshold data in an annotation task provided to multiple data annotation devices, the use of confidence labels can be more consistent across data annotation devices. In several embodiments, data annotation devices are calibrated to utilize the labeling threshold data and/or the confidence labels using training data sets having known identified features.

Feedback can be provided to data annotation devices during a calibration process in order to teach the data annotation device how to utilize the confidence labels in the annotation of source data and/or determine the accuracy of the data annotation device. In a variety of embodiments, the distributed data annotation server system is configured to identify properties (such as the ground truth) of the annotated pieces of source data based on the confidence labels and/or labels included in the annotations. In many embodiments, the ground truth of a piece of source data corresponds to the characteristics of the concept represented by the piece of source data based on a label contained in the annotation of the piece of source data.

Data annotation devices include human annotators, machine-based categorization devices, and/or a combination of machine and human annotation as appropriate to the requirements of specific applications in accordance with embodiments of the invention. The data annotation devices are configured to obtain one or more annotation tasks and pieces of source data and annotate the pieces of source data based on specified annotation tasks. The annotations applied to a piece of source data can include a confidence label describing the certainty that the piece of source data satisfies the annotation task and/or the labeling task in the annotation task. In several embodiments, the annotations include a label describing the ground truth of the content contained in the piece of source data based on the annotation task and the confidence label indicates the certainty with which the data annotation device has assigned the label to the piece of source data.

In a number of embodiments, the distributed data annotation server system is configured to determine data annotation device metadata describing the characteristics of the data categorization devices based on the received annotated pieces of source data. Annotation quality and the confidence in those annotations (as expressed by the confidence labels) can vary between data annotation devices; some data annotation devices are more skilled, consistent, and/or confident in their annotations than others. Some data annotation devices may be adversarial and intentionally provide incorrect or misleading annotations and/or improper confidence labels describing the annotations. The data categorization device metadata can be utilized in the determination of which data categorization devices to distribute subsets of source data and/or in the calculation of rewards (such as monetary compensation) to allocate to particular data categorization devices based on the accuracy of the annotations provided by the data categorization device. Based on the rewards allocated to data categorization devices and the provided annotations, distributed data annotation server systems are configured to determine the amount of information provided per reward and/or the cost of determining features of pieces of source data as appropriate to the requirements of specific applications in accordance with embodiments of the invention.

In a number of embodiments, annotation of data is performed in a similar manner to classification via a taxonomy in that an initial distributed data annotation is performed using broad categories and annotation tasks and metadata is collected concerning the difficulty of annotating the pieces of source data and the capabilities of the data annotation devices. The difficulty of annotating a piece of source data can be calculated using a variety of techniques as appropriate to the requirements of specific applications in accordance with embodiments of the invention, including determining the difficulty based on the accuracy of one or more data annotation devices annotating a piece of source data having a known ground truth value in a calibration (e.g. training) annotation task. Each of the initial broad categories can then be transmitted to data annotation devices by the distributed data annotation server system to further refine the source data metadata associated with each piece of source data in the broad categories and the process repeated until sufficient metadata describing the source data is collected. With each pass across the data by the data annotation devices, the distributed data annotation server system can use the received annotations for one or more pieces of source data to refine the descriptions of the characteristics of the data annotation devices and the updated descriptions can be stored as data annotation device metadata. Based upon the updated data annotation device metadata, the distributed data annotation server system can further refine the selection of data annotation device and/or confidence labels in the annotation tasks to utilize for subsequent annotations of the source data. Specific taxonomy based approaches for annotating source data with increased specificity are discussed above; however, any of a variety of techniques can be utilized to annotate source data including techniques that involve a single pass or multiple passes by the same (or different) set of data annotation device as appropriate to the requirements of specific applications in accordance with embodiments of the invention.

Although the above is described with respect to distributed data annotation server systems and data annotation devices, the data annotation devices can be implemented using the distributed data annotation server system as appropriate to the requirements of specific applications in accordance with embodiments of the invention. Systems and methods for the annotation of source data using confidence labels in accordance with embodiments of the invention are discussed further below.

Distributed Data Annotation Systems

Distributed data annotation systems in accordance with embodiments of the invention are configured to generate confidence labels for pieces of source data, distribute the source data to a variety of data annotation devices, and, based on the annotations obtained from the data categorization devices, identify properties of the source data based on the confidence labels within the annotations. A conceptual illustration of a distributed data annotation system in accordance with an embodiment of the invention is shown in FIG. 1. Distributed data annotation system 100 includes distributed data annotation server system 110 connected to source data database 120 and one or more data annotation devices 130 via network 140. In many embodiments, distributed data annotation server system 110 and/or source data database 120 are implemented using a single server. In a variety of embodiments, distributed data annotation server system 110 and/or source data database 120 are implemented using a plurality of servers. In many embodiments, data annotation devices 130 are implemented utilizing distributed data annotation server system 110 and/or source data database 120. Network 140 can be one or more of a variety of networks, including, but not limited to, wide-area networks, local area networks, and/or the Internet as appropriate to the requirements of specific applications in accordance with embodiments of the invention.

Distributed data annotation system 110 is configured to obtain pieces of source data and store the pieces of source data using source data database 120. Source data database 120 can obtain source data from any of a variety of sources, including content sources, customers, and any of a variety of providers of source data as appropriate to the requirements of specific applications in accordance with embodiments of the invention. In a variety of embodiments, source data database 120 includes one or more references (such as a uniform resource locator) to source data that is stored in a distributed fashion. Source data database 120 includes one or more sets of source data to be categorized using distributed data annotation server system 110. A set of source data includes one or more pieces of source data including, but not limited to, image data, audio data, signal data, and text data. In several embodiments, one or more pieces of source data in source data database 120 includes source data metadata describing attributes of the piece of source data.

Distributed data annotation server system 110 can be further configured to generate confidence labels based on the source data obtained from source data database 120 and create annotation tasks including descriptions of the confidence labels and one or more labeling tasks. Distributed data annotation server system 110 distributes the annotation tasks and subsets of the source data (or possibly the entire set of source data) to one or more data annotation devices 130. Data annotation devices 130 transmit annotated source data to distributed data annotation server system 110. Based on the annotated source data, distributed data annotation server system 110 identifies properties (such as the ground truth) describing the pieces of source data. In many embodiments, distributed data annotation server system 110 is configured to determine the characteristics of the data annotation devices 130 based on the received annotations and/or the identified properties of the source data. The characteristics of data annotation devices 130 can be utilized by distributed data annotation server system 110 to determine which data annotation devices 130 will receive pieces of source data, the weight accorded to the annotations provided by the data annotation device in the determination of source data properties, and/or determine rewards (or other compensation) for annotating pieces of source data. In a number of embodiments, distributed data annotation server system 110 is configured to generate labeling threshold data that is included in the annotation task. The labeling threshold data provides guidance to the data annotation devices 130 in how the confidence labels should be utilized in the annotation of pieces of source data.

Data annotation devices 130 are configured to annotate pieces of source data using confidence labels as provided in an annotation task. Data annotation devices 130 include, but are not limited to, human annotators, machine annotators, and emulations of human annotators performed using machines. Human annotators can constitute any human-generated annotators, including users performing human intelligence tasks via a service such as the Amazon Mechanical Turk service provided by Amazon.com, Inc. In the illustrated embodiment, data annotation devices 130 are illustrated as personal computers configured using appropriate software. In various embodiments, data annotation devices 130 can include (but are not limited to) tablet computers, mobile phone handsets, software running on distributed data annotation server system 110, and/or any of a variety of network-connected devices as appropriate to the requirements of specific applications in accordance with embodiments of the invention. In several embodiments, data annotation devices 130 provide a user interface and an input device configured to allow a user to view the pieces of source data received by the data annotation device and provide annotation(s) for the pieces of source data along with a confidence label indicating the relative certainty associated with the provided annotation in accordance with the labeling task. A variety of labeling tasks can be presented to a data annotation device, including such as identifying a portion of the source data corresponding to an annotation task, determining the content of the source data, determining if a piece of source data conforms with an annotation task, and/or any other task as appropriate to the requirements of specific applications in accordance with embodiments of the invention. In a variety of embodiments, the annotations are performed using distributed data annotation server system 110.

Distributed data annotation systems in accordance with embodiments of the invention are described above with respect to FIG. 1; however, any of a variety of distributed data annotation systems can be utilized in accordance with embodiments of the invention. Systems and methods for data annotation using confidence labels in accordance with embodiments of the invention are described below.

Distributed Data Annotation Server Systems

Figure 2:
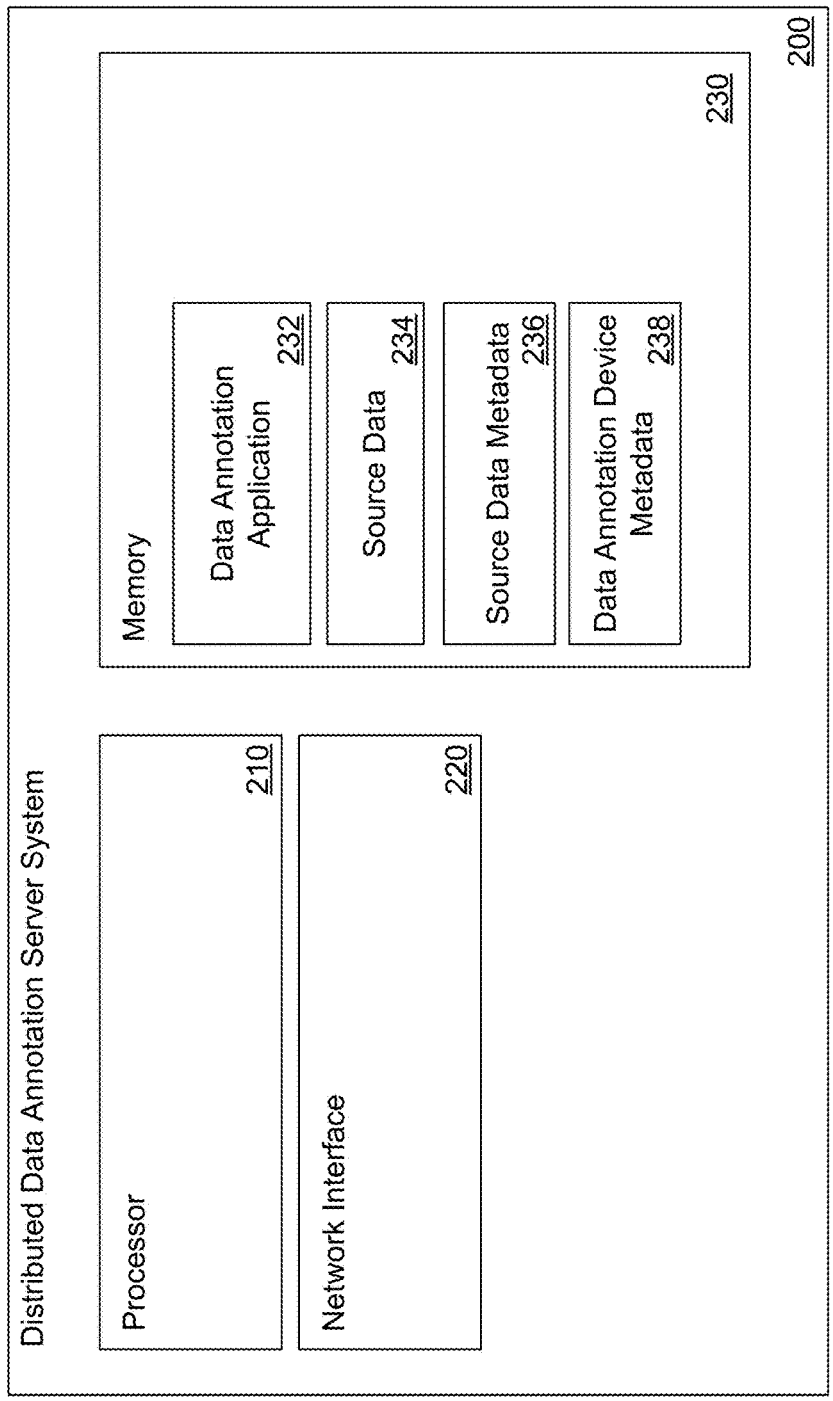
FIG. 2 conceptually illustrates a distributed data annotation server system in accordance with an embodiment of the invention.

Distributed data annotation server systems are configured to obtain pieces of source data, determine confidence labels based on the obtained source data, create annotation tasks for the source data including the confidence labels and labeling tasks, distribute the annotation tasks and source data to data annotation devices, receive annotations including the confidence labels based on the labeling tasks from the data annotation devices, and determine properties of the pieces of source data based on the received annotations. A distributed data annotation server system in accordance with an embodiment of the invention is conceptually illustrated in FIG. 2. Distributed data annotation server system 200 includes processor 210 in communication with memory 230. Distributed data annotation server system 200 also includes network interface 220 configured to send and receive data over a network connection. In a number of embodiments, network interface 220 is in communication with the processor 210 and/or memory 230. In several embodiments, memory 230 is any form of storage configured to store a variety of data, including, but not limited to, data annotation application 232, source data 234, source data metadata 236, and data annotation device metadata 238. In many embodiments, source data 234, source data metadata 236, and/or data annotation device metadata 238 are stored using an external server system and received by distributed data annotation server system 200 using network interface 220. External server systems in accordance with a variety of embodiments include, but are not limited to, database systems and other distributed storage services as appropriate to the requirements of specific applications in accordance with embodiments of the invention.

Distributed data annotation application 232 configures processor 210 to perform a distributed data annotation process for the set of source data 234. The distributed data annotation process can include determining confidence labels based on source data 234, determining labeling tasks that define the properties of the source data to be analyzed, creating annotation tasks including the confidence labels and labeling tasks, and transmitting subsets (or the entirety) of source data 234 along with the annotation tasks to one or more data annotation devices. In many embodiments, the distributed data annotation process includes generating labeling threshold data describing the confidence labels; the labeling threshold data is included in the annotation task. In a variety of embodiments, the subsets of source data and/or the annotation tasks are transmitted via network interface 220. In many embodiments, the selection of data annotation devices is based on data annotation device metadata 238. As described below, the data annotation devices are configured to annotate pieces of source data and generate source data metadata 236 containing labels describing the attributes for the pieces of source data and confidence labels describing the certainty (or lack thereof) of the provided labels. The labels can be generated using the data annotation device and/or be provided in the labeling task included in the annotation task. In several embodiments, the confidence labels are selected based on labeling threshold data. Source data attributes can include, but are not limited to, annotations provided for the piece of source data, the source of the provided annotations, the ground truth of the content of the piece of source data, and/or one or more categories identified as describing the piece of source data. In a variety of embodiments, distributed data annotation application 232 configures processor 210 to perform the annotation processes. The distributed data annotation process further includes receiving the annotated pieces of source data and identifying properties of source data 234 based on the confidence labels, annotations, and/or other attributes in source data metadata 236.

In a number of embodiments, data annotation application 232 further configures processor 210 to generate and/or update data annotation device metadata 238 describing the characteristics of a data annotation device based on the pieces of source data provided to the data categorization device and/or the annotations generated by the data categorization device. Data annotation device metadata 238 can also be used to determine rewards and/or other compensation awarded to a data annotation device for providing annotations for one or more pieces of source data. Characteristics of a data annotation device include pieces of source data annotated by the data annotation device, the annotations (including confidence labels and/or labels) applied to the pieces of source data, previous rewards granted to the data annotation device, the time spent annotating pieces of source data, demographic information, the location of the data annotation device, the annotation tasks provided to the data annotation device, labeling threshold data provided to the data annotation device, and/or any other characteristic of the data categorization device as appropriate to the requirements of specific applications in accordance with embodiments of the invention.

Distributed data annotation server systems are described above with respect to FIG. 2; however, a variety of architectures, including those that store data or applications on disk or some other form of storage and are loaded into the memory at runtime, can be utilized in accordance with embodiments of the invention. Processes for the distributed annotation of source data using confidence labels in accordance with embodiments of the invention are discussed further below.

Annotating Source Data with Confidence Labels

Figure 3:
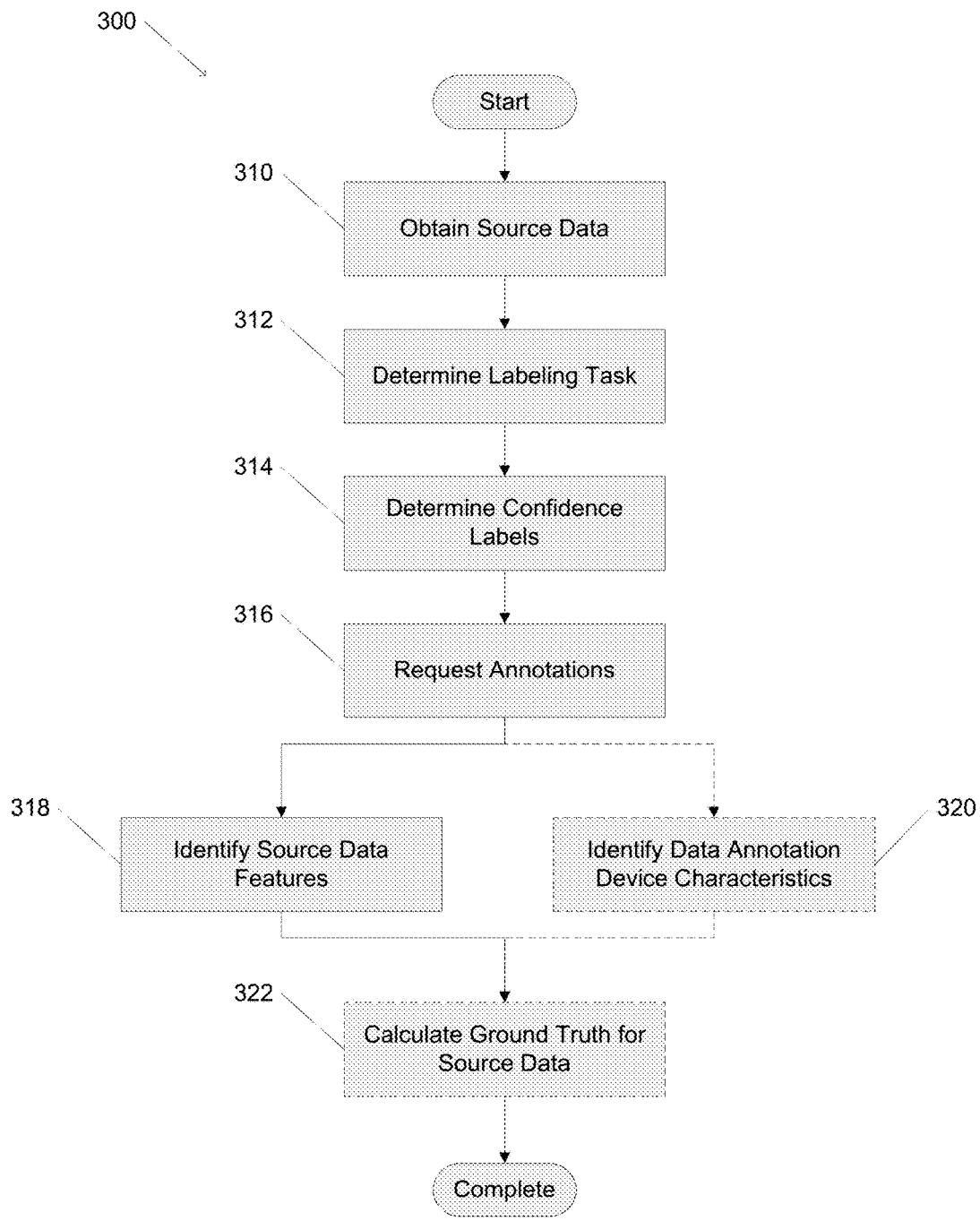
FIG. 3 is a flow chart conceptually illustrating a process for annotating source data using confidence labels in accordance with an embodiment of the invention.

Determining the features of source data can be influenced by a variety of factors, such as the annotator's perception of the source data and the difficulty of determining the features in the source data. These factors can lead to an annotator being less than absolute in a particular annotation generated by the annotator describing a particular piece of source data. By utilizing confidence labels, annotators can provide both a label and a measure of their confidence in the provided label. Distributed data annotation server systems in accordance with embodiments of the invention are configured to generate and utilize confidence labels in the annotation of source data. Distributed data annotation server systems can also utilize confidence labels in the analysis of annotators and/or the determination of rewards for providing annotations. A process for the distributed annotation of source data using confidence labels in accordance with an embodiment of the invention is illustrated in FIG. 3. The process 300 includes obtaining (310) source data. Labeling tasks are determined (312). Confidence labels are determined (314). Annotations are requested (316) and source data features are identified (318). In a number of embodiments, data annotation device characteristics are identified (320). In several embodiments, the ground truth for the source data is calculated (322).

In a variety of embodiments, the obtained (310) source data contains one or more pieces of source data. The pieces of source data can be, but are not limited to, image data, audio data, video data, signal data, text data, or any other data appropriate to the requirements of specific applications in accordance with embodiments of the invention. The pieces of source data can include source data metadata describing attributes of the piece of source data. In many embodiments, determining (312) a labeling task includes determining the feature(s) of the source data for which the annotations are desired. The labeling task can be presented as a prompt to the data annotation devices, a question, or any other method of communicating the labeling task as appropriate to the requirements of specific applications in accordance with embodiments of the invention. In several embodiments, confidence labels are determined (314) based on features of the obtained (310) source data, the determined (312) labeling task, and/or data annotation device characteristics. Confidence labels can include positive confidence, negative confidence, and neutral positions with respect to a particular label determined by an annotator. A variety of confidence labels can be utilized as appropriate to the requirements of specific applications in accordance with embodiments of the invention, such as a scale from "strongly disagree" to "strongly agree" and/or a numerical scale from any number (positive or negative) to any other number. Multiple confidence labels can be determined (314) for a particular annotation task, and, in a variety of embodiments, different confidence labels are determined (314) for different data annotation devices. Additional processes for determining confidence labels that can be utilized in accordance with embodiments of the invention are described in more detail below.

Requesting (316) annotations includes creating one or more annotation tasks including the determined (312) labeling tasks and the determined (314) confidence labels. The annotation tasks along with one or more pieces of the obtained (310) source data are transmitted to one or more annotators. As described above, annotators include data annotation devices such as human annotators, machine-based categorization devices, and/or a combination of machine and human annotation as appropriate to the requirements of specific applications in accordance with embodiments of the invention. The annotators from which annotations are requested (316) annotate at least one of the transmitted pieces of source data using the determined (312) labeling tasks and the determined (314) confidence labels. The annotations include a confidence label and/or one or more labels describing one or more features of the piece of source data based on the determined (312) labeling task. In several embodiments, after the annotations are applied to the pieces of source data, the annotated source data is transmitted to the device requesting (316) the annotations.

Annotator quality and ability can vary between data annotation devices; some data annotation devices are more skilled and consistent in their annotations than others. Some data annotation devices may be adversarial and intentionally provide incorrect or misleading annotations. Additionally, some data annotation devices may have more skill or knowledge about the features of pieces of source data than other data annotation devices. By utilizing the confidence labels, the quality of the annotations provided by various data annotation devices can be measured and utilized in the determination of properties of the pieces of source data. Similarly, the characteristics of the data annotation devices can be determined based on the confidence labels. Identifying (318) source data features can include creating or updating metadata associated with the piece of source data based on the requested (316) annotations. In several embodiments, identifying (318) source data features includes determining a confidence value based on the confidence labels and/or labels contained in the annotations associated with the piece of source data from one or more annotators. In a variety of embodiments, identifying (320) data annotation device characteristics includes creating or updating data annotation device metadata associated with a data annotation device (e.g. an annotator). In many embodiments, identifying (320) data annotation device characteristics includes comparing annotations requested (316) from a particular data annotation device with the source data features identified (318) for source data annotated by the data annotation device. In several embodiments, identifying (320) data annotation device characteristics includes comparing the annotations requested (316) from a data annotation device across a variety of pieces of source data. In a number of embodiments, identifying (320) data annotation device characteristics includes comparing the requested (316) annotations from one data annotation device against annotations for source data requested (316) from a variety of other data annotation devices.

In many embodiments, identifying (318) source data features and/or identifying (320) data annotation device characteristics are performed iteratively. In several embodiments, iteratively identifying (318) source data features and/or identifying (320) data annotation device characteristics includes refining the source data features and/or annotator characteristics based upon prior refinements to the source data features and/or data annotation device characteristics. In a number of embodiments, iteratively identifying (318) source data features and/or identifying (320) data annotation device characteristics includes determining a confidence value for the source data features and/or data annotation device characteristics; the iterations continue until the confidence value for the source data features and/or data annotation device characteristics exceeds a threshold value. The threshold value can be pre-determined and/or determined based upon the confidence utilized in a particular application of the invention.

In a variety of embodiments, calculating (322) the ground truth for one or more pieces of source data utilizes the identified (318) source data features and/or the identified (320) data annotation device characteristics determined based on the confidence labels for the pieces of source data provided by the data annotation devices. In a number of embodiments, source data features have not been identified (318) and/or data annotation device characteristics have not been identified (320). When source data features and/or data annotation device characteristics are not available, the ground truth for a piece of data can be calculated (322) in a variety of ways, including, but not limited to, providing a default set of source data features and/or data annotation device characteristics and determining the ground truth based on the default values. In a number of embodiments, the default data annotation device characteristics indicate annotators of average competence. In certain embodiments, the default data annotation device characteristics indicate annotators of excellent competence. In several embodiments, the default data annotation device characteristics indicate an incompetent annotator. In many embodiments, the default data annotation device characteristics indicate an adversarial annotator. A number of processes can be utilized in accordance with embodiments of the invention to calculate (322) the ground truth for a piece of source data, including, but not limited to, using the weighted sum of the annotations for a piece of source data as the ground truth, where the annotations are weighted based on the competence of the annotators and the confidence labels associated with the annotations.

In several embodiments, the annotations applied to source data and the data annotation devices are modeled using a signal detection framework. A piece of source data i can be considered to have a ground truth value $z_i$. In a number of embodiments, each piece of source data has a signal $x_i$ indicative of $z_i$ and annotators attempt to label the piece of data based upon the signal $x_i$. In many embodiments, the signal $x_i$ is considered to be produced by the generative process $$p(x_i|z_i)$$

that is modeled using a distribution (such as a Normal distribution or a Gaussian distribution, although any distribution can be utilized as appropriate to the requirements of specific applications in accordance with embodiments of the invention) with mean $u_{z_i}$ and variance $\Sigma_{z_i}^2$:

$$p(x|z) = \mathcal{N}(x|\mu_{z_i}, \Sigma_x^2)$$

Each piece of source data is annotated by m data annotation devices (indexed by j). The data annotation devices provide annotations $L_m = \{l_1, l_2, \ldots, l_m\}$, where confidence label $l_j$ is provided by data annotation device j. Each confidence label has a value (for example, an integer value) based on the confidence in the label selected for the annotation by the data annotation device. If a data annotation device sees a signal $y_j$ representing the signal $x_j$ corrupted by noise (such as Gaussian noise), then $$p(y_j|x) = \mathcal{N}(y_j|x, \sigma_j^2)$$

where $\sigma_j$ indicates how clearly the data annotation device can perceive the signal. The data annotation devices can determine the confidence labels based on vector thresholds $$\tau_j = (\tau_{j,0}, \tau_{j,1}, \ldots, \tau_{j,T})$$

where $$\tau_{j,0} = -\infty \text{ and } \tau_{j,T} = \infty$$

and the probability of confidence label $l_j$ is given by the indicator function $$p(l_j = t|\tau_j) = 1(\tau_{j,t-1} \leq y_j \leq \tau_{j,t})$$

The probability of confidence label $l_j$ given an image signal x is $$p(l_j = t|x) = \int_{\tau_{t-1}}^{\tau_t} \mathcal{N}(y_j|x, \sigma^2) dy_j = \Phi(\tau_t|x, \sigma^2) - \Phi(\tau_{t-1}|x, \sigma^2)$$

where $$\Phi(\tau|x, \sigma^2) = \int_{-\infty}^{\tau} \mathcal{N}(y|x, \sigma^2) dy$$

The calculation (322) of the ground truth for a piece of source data based on the confidence labels provided in the requested (316) annotations can be determined using the posterior on z given by Bayes' rule $$p(z|L_m) = p(L_m|z)p(z)/p(L_m)$$

where $$p(L_m|z) = \int_{-\infty}^{\infty} p(L_m, x|z) dx = \int_{-\infty}^{\infty} \left(\prod_{j=1}^{m} p(l_j|x)\right) p(x|z) dx$$

Processes for labeling source data using confidence labels are described above with respect to FIG. 3; however, any of a variety of processes not specifically described above can be utilized in accordance with embodiments of the invention including (but not limited to) processes that utilize different assumptions concerning the statistical distributions of signals indicative of ground truths, and noise within source data. Processes for generating confidence labels and annotation tasks that can be utilized in the annotation of source data in accordance with embodiments of the invention are discussed below.

Generating Annotation Tasks Including Confidence Labels

Figure 4:
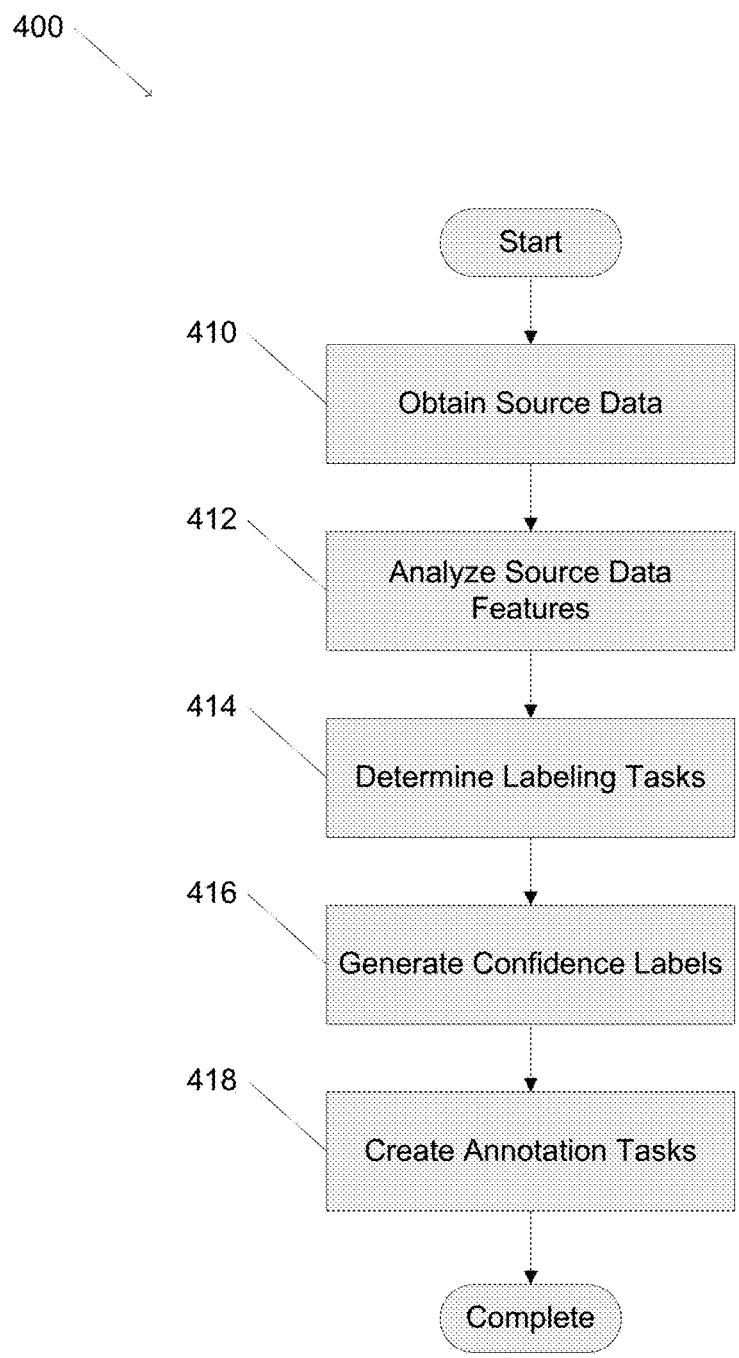
FIG. 4 is a flow chart conceptually illustrating a process for creating annotation tasks including confidence labels in accordance with an embodiment of the invention.

By indicating the relative strength or weakness of a label, confidence labels can be utilized to maximize the amount of information obtained from annotations applied to pieces of source data. This data can be utilized to determine features and/or the ground truth of the piece of source data. Data annotation devices are configured to receive annotation tasks (including confidence labels and labeling tasks) and pieces of source data and annotate the pieces of source data based on the annotation task. Distributed data annotation server systems are configured to generate these annotation tasks along with confidence labels tailored to the pieces of source data to be annotated. A process for creating annotation tasks in accordance with an embodiment of the invention is illustrated in FIG. 4. The process 400 includes obtaining (410) source data. The features of the source data are analyzed (412). Labeling tasks are determined (414) and confidence labels are generated (416). Annotation tasks are created (418).

In many embodiments, source data is obtained (410) utilizing processes similar to those described above. In a variety of embodiments, analyzing (412) features of the source data can include identifying features of the source data that are targeted for further analysis and/or categorization. Identified and/or unidentified features of the source data can be analyzed (412) and selected for further processing. In a number of embodiments, the analyzed (412)

features are determined by providing a set of source data to one or more data annotation devices, generating annotations for the source data, and identifying the features annotated in the pieces of source data. The set of source data can be the obtained (410) source data and/or a subset of the obtained (410) source data that is representative of the entire set of source data. In a variety of embodiments, the ground truth for the subset of source data is determined and the analyzed (412) features includes the determined ground truth. Labeling tasks are determined (414) based on the analyzed (412) features. Any of a variety of labeling tasks, including yes/no (e.g. does a piece of source data conform to a particular statement) tasks and interactive tasks (e.g. identifying a portion of the source data that conforms to a particular statement) can be utilized as appropriate to the requirements of specific applications in accordance with embodiments of the invention. In many embodiments, rewards are associated with particular labeling tasks. Additional processes for determining (414) labeling tasks than can be utilized in accordance with embodiments of the invention are discussed further below.

Confidence labels are generated (416) based on the determined (414) labeling tasks and/or the analyzed (412) source data features. In several embodiments, the confidence labels are generated (416) in order to maximize the bits of information gained from each annotation using an information theoretic channel model. Labels $L_m$ provided by annotator m reduces the uncertainty about the signal z representing a piece of source data by)

$$I(z;L_m)=H(L_m)-H(L_m|z)$$

where H( ) represents the entropy.

In a number of embodiments, the confidence labels are generated (416) in order to maximize the amount of mutual information obtained from the confidence labels, e.g. where $$\tau^*=\arg\max_\tau I(z;L_m|\tau)$$

This function can be maximized utilized any of a variety of maximization functions as appropriate to the requirements of specific applications in accordance with embodiments of the invention, including gradient ascent-based methods. For the gradient $$\nabla I(z;L_m|\tau)$$

the outcome can be maximized using the function $$\frac{\partial}{\partial \tau_t} p(L_m | z) = \int_{-\infty}^{\infty} \frac{\partial}{\partial \tau_t} \left( \prod_{j=1}^{m} p(l_j | x) \right) p(x|z) dx$$

By grouping the annotations provided by a variety of data annotation devices, $$\frac{\partial}{\partial \tau_t} \left( \prod_{j=1}^{m} p(l_j | x) \right) =$$

$$\frac{\partial}{\partial \tau_t} \left( \prod_{k=1}^{T} p(l_j = k | x)^{n(k)} \right) = D_t(x) \prod_{k \notin [t, t+1]} p(l_j = k | x)^{n(k)}$$

where $$D_t(x) = n(t) \frac{\partial p(l_j = t | x)}{\partial \tau_t} p(l_j = t | x)^{n(t)-1} p(l_j = t+1 | x)^{n(t+1)} +$$

$$n(t+1) \frac{\partial p(l_j = t+1 | x)}{\partial \tau_t} p(l_j = t | x)^{n(t)} p(l_j = t+1 | x)^{n(t+1)-1}$$

-continued and $$\frac{\partial}{\partial \tau_t} p(l_j = t | x) = \mathcal{N}(\tau_t | x, \sigma)$$

and $$\frac{\partial}{\partial \tau_t} p(l_j = t+1 | x) = -\mathcal{N}(\tau_t | x, \sigma)$$

By modifying the confidence label threshold τ, the confidence labels can be generated (416) for a particular set of source data. In several embodiments, the confidence label threshold is directly related to the accuracy of the data annotation devices, e.g. the more accurate the annotators, the fewer confidence labels needed to maximize the amount of information captured by the annotations provided by the data annotation devices. In many embodiment, the confidence labels identify confidence intervals identified based on the accuracy of the data annotation devices with respect to the distribution (e.g. a probabilistic distribution) of the labels provided by the data annotation devices within the pieces of training data corresponding to the set of source data.

Annotation tasks can be created (418) using the determined (414) labeling tasks and the generated (416) confidence labels. In a variety of embodiments, annotation tasks also include labeling threshold data describing thresholds present in the generated (416) confidence labels. Processes for generating labeling threshold data are described in more detail below. In a variety of embodiments, annotation tasks are created (418) in order to determine the difficulty of annotating a piece of source data in a calibration (e.g. training) task. The difficulty of annotating a piece of source data can be calculated using a variety of techniques as appropriate to the requirements of specific applications in accordance with embodiments of the invention, including determining the difficulty based on the accuracy of one or more data annotation devices annotating a piece of source data having a known ground truth value in a calibration annotation task.

Processes for generating annotation tasks using confidence labels utilized in the annotation of source data are described above with respect to FIG. 4; however, any of a variety of processes not specifically described above can be utilized in accordance with embodiments of the invention. Processes for generating labeling tasks that can be utilized in the annotation of source data in accordance with embodiments of the invention are discussed below.

Generating Labeling Thresholds (and Rewards) for Annotation Tasks

Figure 5:
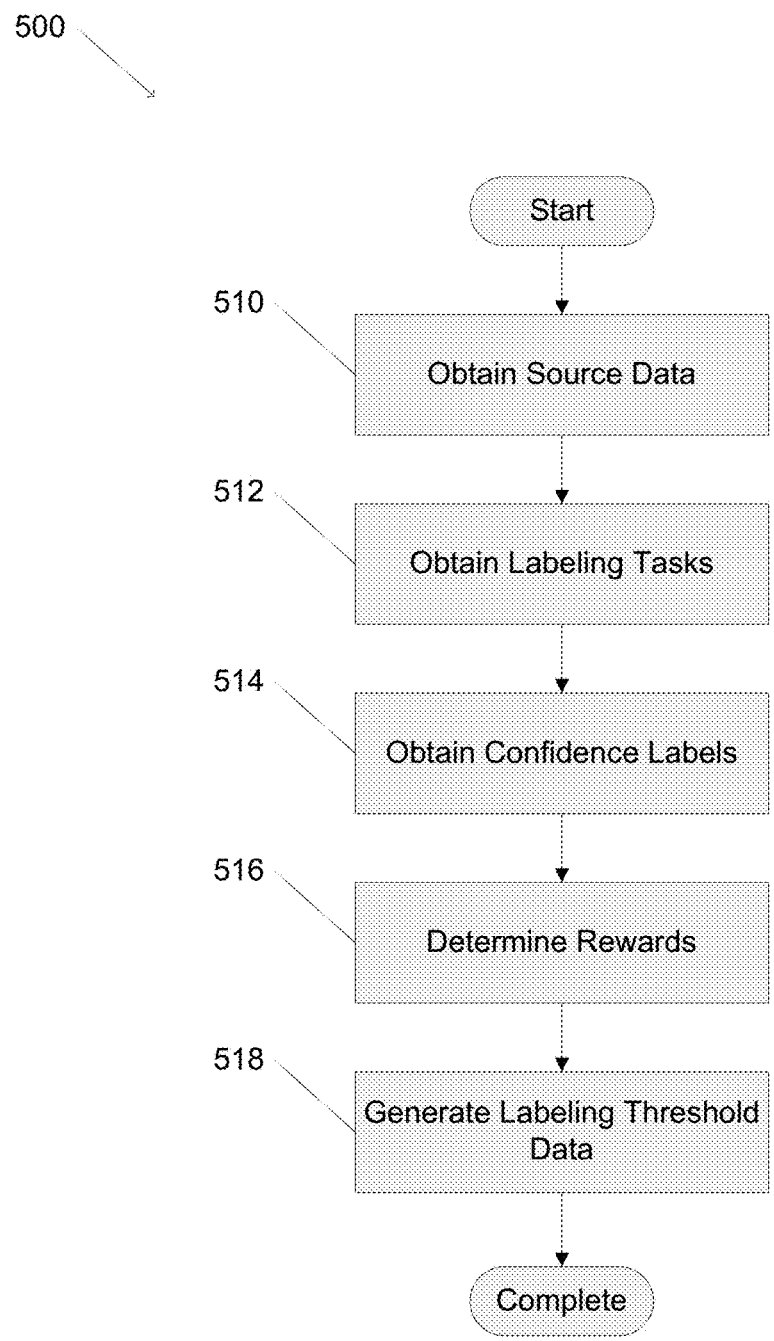
FIG. 5 is a flow chart conceptually illustrating a process for generating labeling tasks for use in annotation tasks in accordance with an embodiment of the invention.

In the absence of direction, data annotation devices tend to utilize confidence labels in inconsistent manners when annotation source data. By providing labeling threshold data describing the various confidence labels, data annotation devices have a baseline standard for utilizing threshold data, improving the determination of features of the source data annotated by various data annotation devices. Additionally, rewards can be allocated to data annotation devices based on the accuracy of the labels provided and/or the use of confidence labels. A process for generating labeling thresholds and rewards utilized in annotation tasks in accordance with an embodiment of the invention is illustrated in FIG. 5. The process 500 includes obtaining (510) source data, obtaining (512) labeling tasks, and obtaining (514) confidence labels. Rewards are determined (516) and labeling threshold data is generated (518).

In several embodiments, source data is obtained (510) utilizing processes similar to those described above. In a number of embodiments, the obtained (512) labeling tasks and/or the obtained (514) confidence labels are generated using processes similar to those described above. Determining (516) rewards can include rewarding those data annotation systems that provide correct labels with a high degree of confidence as expressed using the confidence labels. In many embodiments, the rewards are determined (516) based on the difficulty associated with the obtained (510) source data and/or the obtained (512) labeling tasks. In several embodiments, the rewards are determined (516) based on the amount of time taken by a data annotation device in providing annotations for one or more pieces of source data. In a variety of embodiments, the determined (516) rewards are based on the results of the accuracy of the data annotation device in the annotation of a calibration (e.g. training) data set. Any number of reward schemes can be used to determine (516) the rewards as appropriate to the requirements of specific applications in accordance with embodiments of the invention. In several embodiments, rewards are determined (516) utilizing a reward matrix that specifies a reward $r_{z,t-1}$ for a label $l_j=t$ with ground truth class z. A reward matrix that can be utilized in accordance with embodiments of the invention is $$Ar = 0 \text{ where}$$

$$a_{uv} = \begin{cases} 1-p_1(t) & \text{if } u=t-1 \text{ and } v=t-1, \\ p_1(t)-1 & \text{if } u=t-1 \text{ and } v=t, \\ p_1(t) & \text{if } u=t-1 \text{ and } v=T, \\ -p_1(t) & \text{if } u=t-1 \text{ and } v=T+t, \\ 0 & \text{otherwise} \end{cases}$$

Based on the reward matrix, the maximization of the rewards obtained by a data annotation device can be determined by $$R(l_j \mid x) = r_{0,l_j-1} P(z=0 \mid x) + r_{1,l_j-1} P(z=1 \mid x)$$
$$= r_{0,l_j-1} + P(z=1 \mid x)(r_{1,l_j-1} - r_{0,l_j-1})$$
$$l_j^* = \mathrm{argmax}_{l_j} R(l_j \mid x)$$

with constraints $$R(l_j=t \mid x=\tau_t) = R(l_j=t+1 \mid x=\tau_t)$$

where $\tau$ is the threshold between the different confidence labels. With $$p_1(t) = p(z=1 \mid x=\tau_t)$$

a reward matrix can be estimated using a variety of estimation techniques (such as the least squares method), e.g.

$$\hat{r} = K\hat{\beta}$$

where $$\hat{\beta} = \arg\min_\beta \|r - K\beta\|^2 \text{ and } \hat{r} = \mathrm{vec}(\hat{R}^T)$$

Generated (518) labeling threshold data provides guidance to the data annotation devices regarding the meaning of the confidence labels included in an annotation task. For a piece of source data with signal x, the data annotation devices choose their labels based on an estimate $$p_1 = p(z=1 \mid x)$$

The generated (518) labeling threshold data instructs the data annotation devices regarding p(z) and p(x|z) so $p_1$ can be estimated by the data annotation device:

$$p(z=1 \mid x) = p(x \mid z)p(z)/p(x)$$

In many embodiments, the generated (518) labeling threshold data is provided to the data annotation devices using a calibration (e.g. training) data set that provides feedback to the data annotation devices based on the annotations provided by the data annotation devices.

Processes for generating labeling instructions that can be utilized in the labeling of source data are described above with respect to FIG. 5; however, any of a variety of processes not specifically described above can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for determining labels for crowdsourced annotations, comprising:
   obtaining a set of source data using a distributed data annotation server system comprising a processor and a memory readable by the processor, where the source data comprises a set of unlabeled data;
   obtaining a set of training data using the distributed data annotation server system, where the set of training data comprises a subset of the source data representative of the set of source data;
   determining ground truth data describing the ground truth for each piece of training data in the set of training data using the distributed data annotation server system, where the ground truth data for a piece of training data describes the content of the piece of data;
   providing the sets of annotator data to a plurality of data annotation devices, wherein a data annotation device:
   obtains the set of annotator data;
   generates:
     a set of annotation data based on the obtained set of annotator data; and
     wherein the set of annotation data comprises at least one source data annotation applied to a piece of source data and one training data annotation applied to a piece of training data, where a training data annotation comprises data describing the piece of training data and a confidence label selected from a set of confidence labels describing a measure of confidence in the accuracy of the data describing the piece of training data; and
   transmits the set of annotation data;
   obtaining the sets of annotation data from the plurality of data annotation devices using the distributed data annotation server system;
   calculating annotator accuracy data for each data annotation device for at least one piece of training data in the set of training data based on the ground truth for each piece of training source data and the set of training data annotations using the distributed data annotation server system, wherein the annotator accuracy data describes the accuracy of annotation data provided by a particular data annotation device based on the accuracy and confidence indicated for one or more pieces of training data provided to the particular data annotation device; and automatically generating a set of labels for each piece of unlabeled data in the set of source data based on the calculated annotator accuracy data and the set of annotator labels received from the plurality of data annotation devices using the distributed data annotation server system.

2. The method of claim 1, further comprising, wherein the annotating one or more pieces of source data based on the set of labels using the distributed data annotation server system.

3. The method of claim 1, wherein at least one of the plurality of data annotation devices is implemented using the distributed data annotation server system.

4. The method of claim 1, wherein at least one of the plurality of data annotation devices is implemented using human intelligence tasks.

5. The method of claim 1, further comprising determining the number of confidence labels to provide in the sets of annotator data based on the set of training data using the distributed data annotation server system.

6. The method of claim 5, wherein the number of confidence labels is determined by calculating the number of confidence labels that maximizes the amount of information obtained from the confidence labels using the distributed data annotation server system.

7. The method of claim 1, further comprising determining a set of labeling tasks using the distributed data annotation server system, where a labeling tasks instructs an annotator to provide a label describing at least one feature of a piece of source data.

8. The method of claim 1, further comprising determining rewards based on the annotator accuracy data using the distributed data annotation server system.

9. The method of claim 8, wherein the rewards are determined by calculating a reward matrix using the distributed data annotation server system, where the reward matrix specifies a reward to be awarded to a particular confidence label based on the ground truth of the piece of source data that is targeted by the confidence label.

10. The method of claim 8, wherein the reward for annotating a piece of source data is based on the difficulty of the piece of source data, where the difficulty of a piece of source data is determined based on a set of annotations provided for the source data and a ground truth value associated with the piece of source data.

11. The method of claim 8, further comprising:
generating labeling threshold data based on the training data annotations and the calculated annotator accuracy using the distributed data annotation server system, where the labeling threshold data provides guidance to a data annotation device regarding the meaning of one or more confidence labels in the set of confidence labels;
providing the labeling threshold data along with the set of training data to a data annotation device using the distributed data annotation server system; and
generating feedback based on annotations provided by the data annotation device based on the labeling threshold data and the set of training data using the distributed data annotation server system, where the feedback directs the data annotation device to utilize the labeling threshold data in the annotation of source data.

12. The method of claim 1, wherein each confidence label in the set of confidence labels comprises a confidence interval identified based on the calculated annotator accuracy data and the distribution of the set of annotator labels within the pieces of training data in the set of training data.

13. A distributed data annotation server system, comprising:
a processor; and
a memory connected to the processor and storing a data annotation application;
wherein the data annotation application directs the processor to:
obtain a set of source data, where the source data comprises a set of unlabeled data;
obtain a set of training data, where the set of training data comprises a subset of the source data representative of the set of source data;
determine ground truth data describing the ground truth for each piece of training data in the set of training data, where the ground truth data for a piece of training data describes the content of the piece of training data;
generate sets of annotator data based on the set of source data and the set of training data, where a set of annotator data comprises at least one piece of source data selected from the set of source data and at least one piece of training data selected from the set of training data;
provide the sets of annotator data to a plurality of data annotation devices;
obtain sets of annotation data from the plurality of data annotation devices, where a set of annotation data comprises at least one source data annotation applied to a piece of source data and one training data annotation applied to a piece of training data, where a training data annotation comprises data describing the piece of training data and a confidence label selected from a set of confidence labels describing a measure of confidence in the accuracy of the data describing the piece of training data;
calculate annotator accuracy data for each data annotation device for at least one piece of training data in the set of training data based on the ground truth for each piece of training source data and the set of training data annotations; and
automatically generate a set of labels for each piece of unlabeled data in the set of source data based on the calculated annotator accuracy data and the set of annotator labels received from the plurality of data annotation devices; and
wherein a data annotation device:
obtains a set of annotator data;
generates a set of annotation data based on the obtained set of annotator data; and
transmits the set of annotation data.

14. The system of claim 13, wherein the data annotation application further directs the processor to annotation device to annotate one or more pieces of source data using the set of confidence labels.

15. The system of claim 13, wherein at least one data annotation device in the plurality of data annotation devices is implemented using the distributed data annotation server system.

16. The system of claim 13, wherein at least one data annotation device in the plurality of data annotation devices is implemented using human intelligence tasks.

17. The system of claim 13, wherein the data annotation application further directs the processor to determine the number of confidence labels based on the set of training data.

18. The system of claim 17, wherein the number of confidence labels to be generated is determined by calculating the number of confidence labels that maximizes the amount of information obtained from the confidence labels.

19. The system of claim 13, wherein the data annotation application further directs the processor to determine a set of labeling tasks, where a labeling tasks instructs an annotator to provide a label describing at least one feature of a piece of source data.

20. The system of claim 13, wherein the data annotation application further directs the processor to determine rewards based on the annotator accuracy data.

* * * * *